Figure 1:
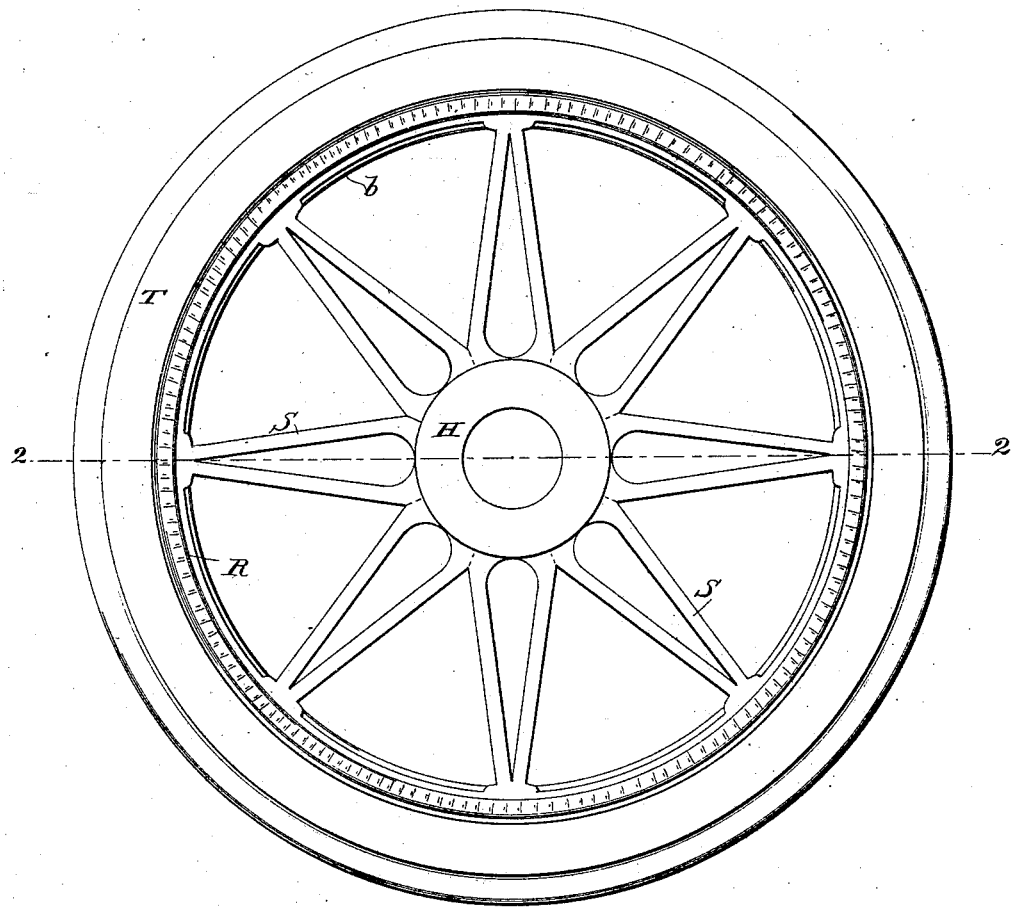

(No Model.)　　　　　　　　　　　　　　　　　2 Sheets—Sheet 1.
S. P. RABER.
CAR WHEEL.

No. 303,750.　　　　　　　　　　　Patented Aug. 19, 1884.

Witnesses:　　　　　　　　　　　　　　　Inventor:

(No Model.) 2 Sheets—Sheet 2.

S. P. RABER.
CAR WHEEL.

No. 303,750. Patented Aug. 19, 1884.

Witnesses:
Ewell Aspin
J. Walter Blandford

Inventor:
Samuel P. Raber
by Marcellus Bailey
his attorney

UNITED STATES PATENT OFFICE.

SAMUEL P. RABER, OF HIGH BRIDGE, NEW JERSEY.

CAR-WHEEL.

SPECIFICATION forming part of Letters Patent No. 303,750, dated August 19, 1884.

Application filed May 31, 1884. (No model.)

*To all whom it may concern:*

Be it known that I, SAMUEL P. RABER, of High Bridge, in the county of Hunterdon and State of New Jersey, have invented certain new and useful Improvements in Car-Wheels, of which the following is a specification.

My invention has relation to wheels, designed more particularly for railroad-car and locomotive wheels, and consisting of a wrought-iron or steel center combined with a steel tire.

The invention has reference to the construction of the hub and the manner of mounting and securing the spokes thereon; and it also refers to the manner of uniting the tire with the center, the object of this last-mentioned portion of my invention being to firmly and securely attach the tire to the center without the use of bolts, rivets, retaining-rings, and like devices ordinarily employed for the purpose. I form the hub of an inner cylinder, on which are mounted the spokes, the latter having lateral fins or flanges on their inner ends, which are covered and surrounded by external sleeves mounted on the inner cylinder, the whole being subsequently raised to welding-heat, and then by pressure united together as a solid forging. With a view to reducing the cost of manufacture and to putting the hub in a condition in which all its parts can be more rapidly and evenly heated to the requisite extent, I prefer to make both the inner cylinder and the external sleeves of bar-iron or steel coiled into the proper shape. To unite the tire to the center, I form the tire on its two sides with grooves—preferably undercut—and I form on the rim of the center flanges or tongues, which are bent so as to form hooks which enter and engage the grooves in the tire, and serve to unite the latter to the rim by a tongue-and-groove connection without the aid of any bolts, rivets, or separate rings, such as heretofore used for the purpose. On those portions of the tire which are overlapped by the rim-tongues I form indentations, into which the tongues are pressed, so as to engage the tire, and to prevent it from possibly slipping when, in use, it happens to become heated and consequently expanded. Between the tire and the rim I prefer to interpose a sound-deadening material, which should be an incombustible substance, like asbestus or mineral wool, so that it will not be injuriously affected by the heat of the tire when the latter is shrunk upon the rim.

The nature of my improvements and the manner in which the same can be carried into effect will be readily understood by reference to the accompanying drawings, in which—

Figure 2:
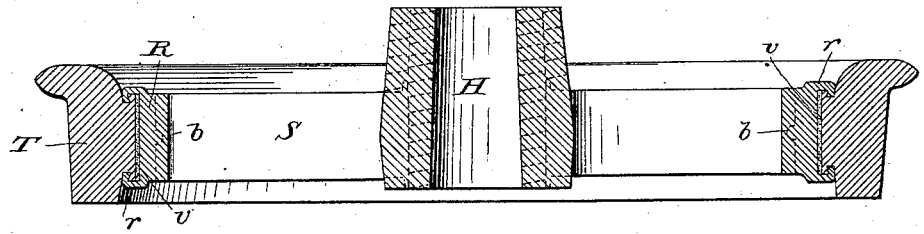
Figure 3:
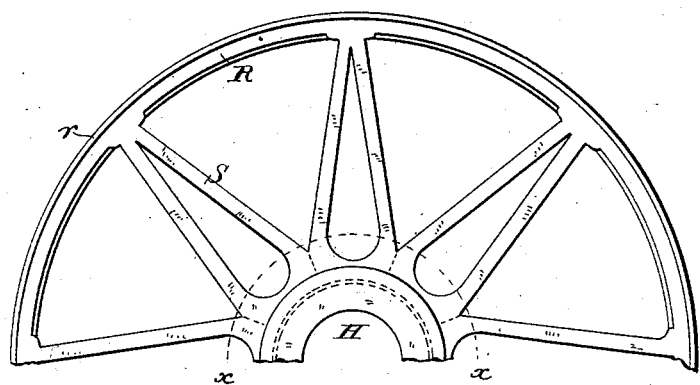
Figure 4:
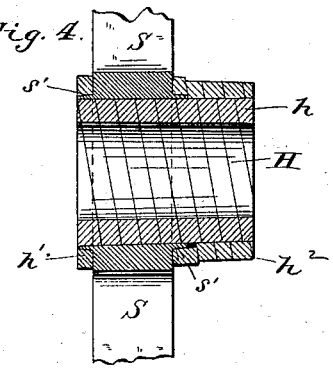
Figure 5:
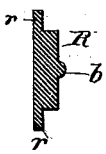
Figure 6:
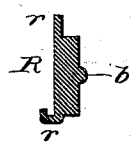
Figure 7:
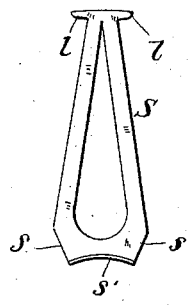
Figure 8:
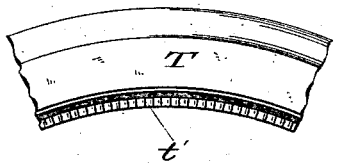
Figure 9:
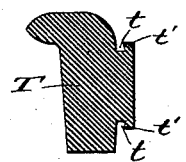

Figure 1 is a side elevation of a car-wheel embodying said improvements in their preferred form. Fig. 2 is a section of the same on line 2 2, Fig. 1. Fig. 3 is a side elevation of one-half of the center of the wheel, the center including the hub, the spokes, and the rim. Fig. 4 is a longitudinal central section of the unfinished hub, together with the inner ends of spokes mounted thereon. Fig. 5 is a cross-section of the rim before its side flanges or tongues are bent. Fig. 6 is a like section of the same with one of them bent. Fig. 7 is a side elevation of one of the spokes, with the outer lips, $l$, of its arms welded together. Fig. 8 is a side elevation, and Fig. 9 is a cross-section, of a portion of the tire.

In Fig. 1 the steel tire is lettered T, and the wheel-center is indicated by the letters H S R, being made up of the hub H, the spokes S, and the rim R.

The hub consists, as shown in Fig. 4, of the inner cylinder, $h$, and the outer sleeves, $h'\ h''$, fitting thereon. The spokes S may be of any suitable pattern—for instance, either heavy solid single spokes or the lighter flat twin spokes shown in the drawings. Whatever may be their construction otherwise, they are shaped at their bases to fit upon the inner hub-cylinder, $h$, with inclined faces $s$, of such form as to permit the spokes, when placed on the cylinder, to have contact with one another throughout said faces, and with lateral fins or flanges $s'$—one on each side—to be overlapped by the sleeves $h'\ h''$, respectively. I prefer, for reasons herein stated, to form the parts $h\ h'\ h''$ of coiled bar-iron or steel, as indicated in the sectional view, Fig. 4, said parts being coiled, in a well-known way, upon suitable taper mandrels, so that the interior of the coil $h$ may have the taper required for the interior of the finished hub, and the coils $h'\ h''$ may be made of a size and taper to fit snugly upon the exterior of the coil $h$. The spokes are arranged around the inner coil, $h$, in the manner indicated in Fig. 3, in the space between the outer coils, $h'\ h''$, which latter, as indicated in Fig. 4, overlap the lateral base flanges or fins $s'$ of the spokes, and in this way the spokes are firmly clasped and held. The fagot thus formed is thoroughly heated to welding-heat, the portions to be raised to this heat being included within the compass of the dotted circle $x$, Fig. 3. A taper plug of proper dimensions is fitted into the coil $h$, and the portion of the center included within the circle $x$ is placed in matrices of suitable shape, (having of course arms or other suitable means for supporting the spokes from without,) and the matrices are then forced together under a heavy hammer or hydraulic press, and the taper plug driven down into interior of the hub, thus exerting a powerful pressure from without upon the periphery and ends of the hub, and also from within the hub, with the result of thoroughly welding the parts, pressing them together into the exact form of a perfect hub, (seen in section in Fig. 2,) to which (as well as to one another through their faces $s$) the spokes are welded. The spokes, through the intermediary of the fins $s'$ and coils or sleeves $h'\ h''$, are held firmly to the inner cylinder, and all the parts S $h\ h'\ h''$ are brought together as securely as though they constituted a solid forging.

The rim R is made of a bar rolled to an approximately T form in cross-section, being provided on each side with a lateral tongue or flange, $r$. The manner of uniting the rim to the spokes forms no part of my invention. If the rim be made separately from the spokes, as is supposed in the present instance, it is welded firmly to the lips $l$ on the outer ends of the spokes; and in some cases, with a view to prevent more surely lateral displacement of the rim, I form on its inner face a bead, $b$, as indicated in Figs. 2, 5, and 6, which enters corresponding grooves formed in the outer faces of the lips $l$. Before welding on the rim to the spokes I prefer to bend up one of the tongues $r$ into the hook shape shown in Fig. 6, so as to adapt it to enter one of the grooves $t$, formed in the tire T at the time the latter is fitted upon the rim.

The tire T, of otherwise usual form, has formed in each of its sides, near the inner edge, one of these grooves $t$, which, as shown in section, Fig. 9, are slightly undercut. That portion of the side of the tire between the groove and the inner edge of the tire is scored, indented, or milled, as shown at $t'$, Fig. 8. Before fitting the tire to the rim the entire periphery of the rim is turned true to the proper diameter, and the inner face of the tire is turned true to a diameter corresponding with that of the rim, with suitable allowance for shrinking it firmly to the same. After the rim is turned true, and before the tire is put on, I prefer to cover the periphery of the rim with a strip of asbestus, felt, or mill-board, or other suitable substance—such as mineral wool—which will not be affected injuriously by the heat necessarily employed during the operation of uniting the tire and rim together. This strip is shown at $v$. It is of suitable thickness and serves to check the transmission of vibrations between the steel tire and the wheel-center, thereby preventing crystallization of the center and the axle, as well as reducing to a minimum the noise attending the running.

In applying the tire to the rim the tongues $r$ are heated, and the tire is also slightly heated, not enough to injure the steel, but only to cause the tire to expand sufficiently to allow it to pass around the rim, the asbestus preventing actual contact of the two. The tire is then fitted over upon the rim and pressed along until one of its grooves $t$ is entered and filled by that one of the rim-tongues $r$ which, as seen in Fig. 6, is already bent up into hook form. As soon as this is done the other flange $r$ is by suitable tools or mechanism turned up into the other groove $t$ of the tire, and then, by rolls milled or toothed to correspond with the milled or indented edges $t'$ of the tire, the flanges are forced into the grooves $t$, so as to fill them, and the metal of which said flanges are formed is forced into the indentations or scores on the milled edges of the tire, thus interlocking with the tire and securing the tire and rim together so thoroughly that the tire cannot move if, by reason of wear or frictional heat, it should expand, nor separate from the rim in event of fracture, and this without the aid of bolts, rivets, separate rings, or like devices hitherto employed. In pressing the flanges into interlocking engagement with the tire the pressure is applied to both flanges simultaneously.

Having described my improvements and the best way known to me of carrying the same into effect, what I claim as new, and of my own invention, is—

1. In a car-wheel center, the combination of a hub-cylinder, spokes arranged around the same, and provided at their bases or inner ends with lateral flanges or fins, and binding-sleeves mounted on said cylinder and overlapping the lateral flanges or fins of the spokes, the whole fitted and welded together, substantially as hereinbefore set forth.

2. A hub formed of concentric coils of iron or steel, in combination with spokes formed and mounted thereon and secured thereto, substantially in the manner and for the purposes hereinbefore set forth.

3. The combination, with the hub and the spokes, of the solid flanged rim R and the grooved steel tire fitted upon and engaged by the said rim, as hereinbefore shown and described.

4. The tire formed with grooves, and with milled or indented edges, in combination with the rim having flanges which engage said grooves and are forced into the indentations in said milled edges, substantially as and for the purposes hereinbefore set forth.

In testimony whereof I have hereunto set my hand this 21st day of May, A. D. 1884.

SAMUEL P. RABER.

Witnesses:
EWELL A. DICK,
J. WALTER BLANDFORD.